United States Patent Office 2,816,045
Patented Dec. 10, 1957

2,816,045

PHTHALOCYANINE PIGMENTS

Joseph H. Cooper, Hillside, and Arthur J. Stratton, West Orange, N. J., assignors to E. I. du Pont de Nemours & Company, Wilmington, Del., a corporation of Delaware No Drawing. Application August 31, 1953,
Serial No. 377,724

9 Claims. (Cl. 106—288)

This invention relates to new phthalocyanine pigments and coating compositions containing the same. More particularly, it relates to a new series of phthalocyanine pigments that are resistant to flocculation in lyophilic organic coating composition vehicles.

Phthalocyanine pigments are well known for their outstanding tinctorial strength and resistance to light and chemical agents. Such pigments are also known to have a serious defect commonly referred to as flocculation, a characteristic evidenced by an apparent aggregation of pigment particles during setting and drying of organic coating compositions containing the same, resulting in marked reduction of color strength. In general, this effect is reversible under vigorous agitation such as exists during the brushing of a paint film or during the passage of a paint through the orifice of a spray gun. However, in many types of paints or enamels, and always in compositions suitable for application by brush, there is an appreciable interval after application during which the film retains sufficient fluidity to permit flocculation to occur. If this film is disturbed before it completely dries, as by brushing over it in joining with a newly brushed portion, the flocculates are broken up with a consequent marked gain in color strength. This phenomenon or flocculation is undesirable because the color strength of the film is less than the pigment is inherently capable of yielding and because it is difficult, if not impossible, to apply such paints by brushing and obtain uniform coloration. The reversibility of the flocculation phenomena may moreover be used as a test for flocculation by making a typical tint enamel, say 10 parts of phthalocyanine to 90 parts of $TiO_2$, in an oil-modified alkyd resin and applying to a test panel by spraying in the conventional manner. When the film has become tacky, usually in 3–5 minutes, a portion of the panel is rubbed as with a soft cloth. If flocculation has occurred, the rubbed portion will appear darker or stronger than the unrubbed portion.

Numerous attempts have been made to eliminate the defect of flocculation of phthalocyanine pigments, for example, the addition of aluminum benzoate, or phthalocyanine monosulfonic acid to the phthalocyanine pigments subject to flocculation.

In U. S. Patents Nos. 2,099,689 and 2,099,690, phthalocyanine polysulfonic acids containing two or more sulfonic acid groups per molecule as their metallic salts including the alkaline earth metals and aluminum are disclosed as pigments. These have never achieved significant commercial success because of their poor color value and high cost in comparison to the unsulfonated species. The corresponding water-soluble sodium salt has, however, become an article of commerce as a textile dyestuff.

It is well known that pure copper phthalocyanine pigments exhibit a pronounced tendency to grow crystals in many hydrocarbon solvents, particularly those of an aromatic nature, with consequent loss of tinctorial strength. To obviate this defect, it is also well known to introduce small amounts of chlorine, usually about 3%–5%, which is appreciably less than one atom of chlorine per molecule of phthalocyanine. Such chlorine-containing pigments are not significantly altered in shade and are substantially free from the tendency to grow crystals in solvents. Chlorine is also sometimes introduced in larger amounts to alter the hue toward green. Throughout the specification and claims reference to copper phthalocyanine is intended to include chlorine-containing copper phthalocyanine.

It is an object of this invention to produce phthalocyanine pigments which are highly resistant to flocculation in organic vehicle coating compositions. It is a further object of this invention to produce certain new phthalocyanine pigments. Other objects will appear hereinafter.

The objects of this invention are attained by preparing new pigments which comprise intimate mixtures of a major portion of an unsulfonated phthalocyanine pigment subject to flocculation in an organic coating vehicle, such as copper phthalocyanine, and a minor portion of an insoluble metal salt, particularly the aluminum salt, of a copper phthalocyanine polysulfonic acid containing two or more sulfonic acid groups per molecule. The new pigments are highly resistant to flocculation in organic coating composition vehicles; they retain the tinctorial properties of the predominant phthalocyanine pigment to a very high degree; and they do not exhibit the inferior lightfastness and inferior resistance to chemical action characteristic of the pigments previously prepared from phthalocyanine polysulfonic acids.

The following examples illustrate, in detail, several processes for the production of the new pigments of this invention.

Example I

Fifty-seven hundred (5700) grams of a 15.8% aqueous paste (900 grams solid) of a copper phthalocyanine pigment containing about 4% chlorine is slurried in a suitable container with water to give a total volume of about 12,000 cc. One hundred (100) grams of a commercial copper phthalocyanine sodium polysulfonate (about 50% purity and about 2.5 —$SO_3H$ groups per copper phthalocyanine molecule) is then added and stirring continued until solution of the water-soluble dye is complete. There is then added over a period of 3–5 minutes a solution of 200 grams barium chloride ($BaCl_2 \cdot 2H_2O$) in 2000 cc. warm water. The slurry is then stirred at about room temperature for about one hour, filtered, washed free of soluble salts and dried at a temperature of about 60° C. One thousand (1000) grams of strong, blue copper phthalocyanine pigment comprising 90% by weight of the starting copper phthalocyanine pigment and 10% by weight of the barium salt of copper phthalocyanine polysulfonic acid results which may be pulverized before use. When dispersed in a suitable organic coating composition vehicle, the resulting composition is highly resistant to flocculation.

Example II

Since many commercial water-soluble dyes such as copper phthalocyanine polysulfonic acid may contain varying amounts of sodium sulfate, the use of barium salts as the precipitant may result in undesirable contamination of the final pigment with barium sulfate. Accordingly, Example I is repeated except that 180 grams of aluminum sulfate $Al_2(SO_4)_3 \cdot 18H_2O$ is substituted for 200 grams of $BaCl_2 \cdot 2H_2O$. The yield of pigment is substantially the same and it is likewise capable of giving paints and enamels which are highly resistant to flocculation.

Example III

Six thousand (6000) grams of 15.8% aqueous paste (950 grams solids) of a copper phthalocyanine pigment containing about 4% chlorine is slurried with water to give a total volume of about 12,000 cc. In a separate container 50 grams of copper phthalocyanine sodium polysulfonate of about 50% purity and having about 2.75 $SO_3H$ groups per copper phthalocyanine molecule is dissolved in 500 cc. warm water. The dye solution is then added to the pigment slurry and the mixture stirred until uniform and the soluble dye precipitated on the pigment by adding slowly (3–5 minutes) a solution of 90 grams alum $(Al_2(SO_4)_3 \cdot 18H_2O)$ in 900 cc. warm water. After stirring for a short time at room temperature, the pigment is separated by filtering, washing free of soluble salts, drying and pulverizing. The resulting 1000 grams of blue pigment comprising 95% by weight of the starting copper phthalocyanine pigment and 5% by weight of the aluminum salt of copper phthalocyanine polysulfonic acid may be incorporated into a suitable vehicle to give an enamel or a lacquer which is highly resistant to flocculation.

*Example IV*

Products very similar to that of Example I can be obtained by using the following salts in place of the 200 grams of $BaCl_2 \cdot 2H_2O$ used in Example I:

| | Grams |
|---|---|
| $ZnSO_4 \cdot 7H_2O$ | 236 |
| $MgSO_4 \cdot 7H_2O$ | 200 |
| $SnCl_2 \cdot 2H_2O$ | 185 |
| $CdSO_4 \cdot 4H_2O$ | 230 |
| $MnSO_4 \cdot 4H_2O$ | 180 |
| $ZrOCl_2 \cdot 8H_2O$ | 220 |

*Example V*

Ten (10) pounds of copper phthalocyanine sodium polysulfonate is dissolved in about 50 gallons of water at about 50° C. with good agitation. Fifteen (15) pounds of alum $(Al_2SO_4)_3 \cdot 18H_2O)$ is then dissolved in 15 gallons of water at about 50° C. and the alum solution is added slowly (5–10 minutes) to the well-agitated dye solution at about 50° C. The precipitated dye is stirred for about 30 minutes at 50° C. and isolated by filtration and washing. This washed paste, substantially free of soluble salts, is then added to 450 pounds of a 20% paste of copper phthalocyanine. The pastes are thoroughly mixed with the addition of more water as needed to maintain a suitable mixing consistency and finally dried and pulverized. The resulting pigment comprising 90% by weight of the starting copper phthalocyanine pigment and 10% by weight of the aluminum salt of copper phthalocyanine polysulfonic acid can be used to make coating compositions which are highly resistant to flocculation.

As illustrated in the examples, the metal salt of the copper phthalocyanine polysulfonic acid may be precipitated in the presence of the phthalocyanine pigment to render the same resistant to flocculation, or it may be separately precipitated and then mixed with the pigment to produce a flocculation-resistant pigment.

Commercial copper phthalocyanine polysulfonic acids are not pure because of the difficulties of isolating such water-soluble dyes in pure form. They are usually isolated by salting out of water solution, so that the resulting products contain significant quantities of inorganic salts such as sodium sulfate or sodium chloride. Furthermore, these products are commonly sold as textile dyes and are standardized for strength by the addition of similar salts. Hence, the actual amount of pure dye used may be considerably less than the figures shown in the examples above. It appears that 2%–3% of actual dye (3%–5% of the commercial dye) is the lower practical limit for significant improvement in flocculation resistance. As the dye is increased above about 5% of the commercial product, there is an optimum effect in the range of 5%–10%. Further increase causes the product to assume the characteristics of the pure metal salt of the dye to a greater or lesser extent. For instance, the hue becomes greener, there is a marked loss in strength and a tendency to bleed under specific conditions. These undesirable effects are accompanied by a higher cost so that the practical range for the purposes of this invention is between about 2% and 15% of the insoluble metal salt of copper phthalocyanine polysulfonic acid. Preferred compositions usually contain 90–97% by weight of unsulfonated phthalocyanine pigment and 10–3% by weight of the insoluble metal salt of copper phthalocyanine polysulfonic acid. A specific preferred composition contains 95% by weight of copper phthalocyanine and 5% by weight of the aluminum salt of copper phthalocyanine polysulfonic acid.

The preferred metal for precipitation of the insoluble metal salt from the soluble dye is aluminum, usually used in the form of aluminum sulfate. It is easily available, inexpensive, does not precipitate any of the salts commonly present as diluents in the commercial copper phthalocyanine polysulfonic acids and gives very desirable results with respect to inhibiting flocculation.

The alkaline earth metals such as barium and calcium also give insoluble precipitates with the commercial dye which are effective inhibitors of flocculation. However, they also form precipitates with the sodium sulfate commonly present and thus cause some dilution and loss in color strength. Zinc, magnesium, and tin also are effective precipitants, but offer no advantage over the preferred aluminum salt. These metals are frequently used in the form of their chlorides, or sulfates, in the case of zinc and magnesium.

The usual variables of concentration, temperature, pH, and the like, appear to be of minor significance in the results of this operation. The concentrations of reactants have certain physical limitations for practical operation. Thus, a copper phthalocyanine pigment slurry with a solids content much above 10% is usually difficult to agitate properly. The concentration of the dye must be such that it is all in solution, and should, therefore, probably not exceed about 10%. The temperature of the reactants at the time of the formation of the metal salt of the dye has been varied from room temperature (15–20° C.) to near the boil without significant effect on the result.

When using aluminum ion as the precipitant, a pH above the neutral point may cause the precipitation of excess aluminum as the hydrate which is generally undesirable, though not significant with respect to the invention. Moreover, if the reaction medium is very alkaline (above pH 8.0), there is a marked tendency to solubilize the dye with consequent bleeding out during the isolation of the final product.

Although the invention has been described with particular reference to copper phthalocyanine, it is not intended to be so restricted and the treatment of any flocculating phthalocyanine pigment by the methods of this disclosure will inhibit its flocculation.

The pigments of this invention have all the desirable properties and uses of phthalocyanine pigments well known in the paint, enamel, and varnish arts. The pigments of this invention are particularly valuable for use in paints, enamels, and varnishes where the prior art pigments were subject to flocculation and did not exhibit full potential color strength.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. A phthalocyanine pigment highly resistant to flocculation in a lyophilic organic coating vehicle consisting essentially of a major amount of an unsulfonated copper phthalocyanine pigment subject to said flocculation and from 2–15% by weight of an insoluble metal salt of copper phthalocyanine polysulfonic acid, said metal being selected from the group consisting of barium, magnesium, cadmium, manganese, zirconium, zinc, aluminum, and tin.

2. A phthalocyanine pigment highly resistant to flocculation in a lyophilic organic coating vehicle comprising 90% to 97% by weight of an unsulfonated copper phthalocyanine pigment subject to said flocculation and 10% to 3% by weight of an insoluble metal salt of copper phthalocyanine polysulfonic acid, said metal being selected from the group consisting of barium, magnesium, cadmium, manganese, zirconium, zinc, aluminum, and tin.

3. A phthalocyanine pigment highly resistant to flocculation in an organic coating vehicle comprising 90% to 97% by weight of a lyophilic unsulfonated copper phthalocyanine pigment subject to said flocculation and 10% to 3% by weight of the aluminum salt of copper phthalocyanine polysulfonic acid.

4. A phthalocyanine pigment highly resistant to flocculation in a lyophilic organic coating vehicle comprising 90% to 97% by weight of an unsulfonated copper phthalocyanine pigment subject to said flocculation and 10% to 3% by weight of the barium salt of copper phthalocyanine polysulfonic acid.

5. A phthalocyanine pigment highly resistant to flocculation in a lyophilic organic coating vehicle consisting essentially of 90–97% by weight of copper phthalocyanine and 10–3% by weight of the aluminum salt of copper phthalocyanine polysulfonic acid.

6. A phthalocyanine pigment highly resistant to flocculation in a lyophilic organic coating vehicle consisting essentially of about 95% by weight of copper phthalocyanine and about 5% by weight of the aluminum salt of copper phthalocyanine polysulfonic acid.

7. A coating composition comprising a lyophilic organic coating vehicle and a pigment consisting essentially of a major amount of an unsulfonated copper phthalocyanine pigment subject to said flocculation and from 2–15% by weight of an insoluble metal salt of copper phthalocyanine polysulfonic acid, said metal being selected from the group consisting of barium, magnesium, cadmium, manganese, zirconium, zinc, aluminum and tin.

8. A coating composition comprising a lyophilic organic coating vehicle and a pigment comprising 90% to 97% by weight of an unsulfonated copper phthalocyanine pigment subject to said flocculation and 10% to 3% by weight of an insoluble metal salt of copper phthalocyanine polysulfonic acid, said metal being selected from the group consisting of barium, magnesium, cadmium, manganese, zirconium, zinc, aluminum and tin.

9. A coating composition comprising a lyophilic organic coating vehicle and a pigment comprising 90% to 97% by weight of an unsulfonated copper phthalocyanine pigment subject to said flocculation and 10% to 3% by weight of the aluminum salt of copper phthalocyanine polysulfonic acid.

References Cited in the file of this patent

UNITED STATES PATENTS 2,526,345     Giambalvo _____ Oct. 17, 1950

U. S. DEPARTMENT OF COMMERCE

PATENT OFFICE

CERTIFICATE OF CORRECTION

Patent No. 2,816,045                              December 10, 1957

Joseph H. Cooper et al.

It is hereby certified that error appears in the printed specification of the above numbered patent requiring correction and that the said Letters Patent should read as corrected below.

Column 1, line 38, for "phenomenon or" read --phenomenon of--; column 5, line 18, for "in an organic" read --in a lyophilic organic--; line 19, for "weight of a lyophilic" read --weight of an--.

Signed and sealed this 1st day of April 1958.

(SEAL)
Attest:

KARL H. AXLINE

Attesting Officer

ROBERT C. WATSON
Commissioner of Patents